United States Patent
Wilsher

(10) Patent No.: US 7,312,829 B2
(45) Date of Patent: Dec. 25, 2007

(54) METHOD OF DETERMINING A DEVICE SPECTRAL RESPONSE

(75) Inventor: Michael John Wilsher, Herts (GB)

(73) Assignee: FFEI Limited (GB)

( * ) Notice: Subject to any disclaimer, the term of this patent is extended or adjusted under 35 U.S.C. 154(b) by 1095 days.

(21) Appl. No.: 10/197,170

(22) Filed: Jul. 15, 2002

(65) Prior Publication Data
US 2004/0008969 A1   Jan. 15, 2004

(51) Int. Cl.
*H04N 7/12* (2006.01)
(52) U.S. Cl. .................................. 348/384.1
(58) Field of Classification Search ............... 348/384.1
See application file for complete search history.

(56) References Cited

U.S. PATENT DOCUMENTS

| | | | |
|---|---|---|---|
| 5,148,288 A | | 9/1992 | Hannah |
| 5,668,596 A * | | 9/1997 | Vogel ..................... 348/222.1 |
| 6,184,925 B1 * | | 2/2001 | Abe et al. ................ 348/223.1 |
| 6,215,562 B1 * | | 4/2001 | Michel et al. ............... 358/1.9 |
| 6,377,300 B1 * | | 4/2002 | Morris et al. .......... 348/207.99 |
| 6,430,313 B1 * | | 8/2002 | Smith et al. ................ 382/167 |
| 6,724,423 B1 * | | 4/2004 | Sudo ........................ 348/188 |
| 6,734,899 B1 * | | 5/2004 | Okamoto .................... 348/188 |
| 6,864,915 B1 * | | 3/2005 | Guimaraes et al. ...... 348/222.1 |
| 6,980,231 B1 * | | 12/2005 | Ohsawa .................... 348/188 |
| 2001/0023058 A1 | | 9/2001 | Jung et al. |
| 2003/0038954 A1 * | | 2/2003 | Odagiri et al. .............. 358/1.9 |

OTHER PUBLICATIONS

Pratt, William K. and Mancill, Clanton E., "Spectral Estimation Techniques for the Spectral Calibration of a Color Image Scanner," Applied Optics, Jan. 1976, pp. 73-75. vol. 15, No. 1, Optical Society of America, U.S.A.

* cited by examiner

*Primary Examiner*—Vivek Srivastava
*Assistant Examiner*—James M. Hannett
(74) *Attorney, Agent, or Firm*—Sughrue Mion, PLLC

(57) ABSTRACT

A method is provided of determining a device spectral response for an image recording device. The method comprises obtaining a filtered light response from a number of filters of a filter set, wherein each filter has a pass band with at least one boundary defined by a transition region. In the wavelength region of interest adjacent transition regions of the same sense are substantially non-overlapping. The obtained filtered light response for each filter is stored as response data. The device spectral response is determined using the stored response data and separately determined data describing the spectral response of the number of filters.

25 Claims, 7 Drawing Sheets

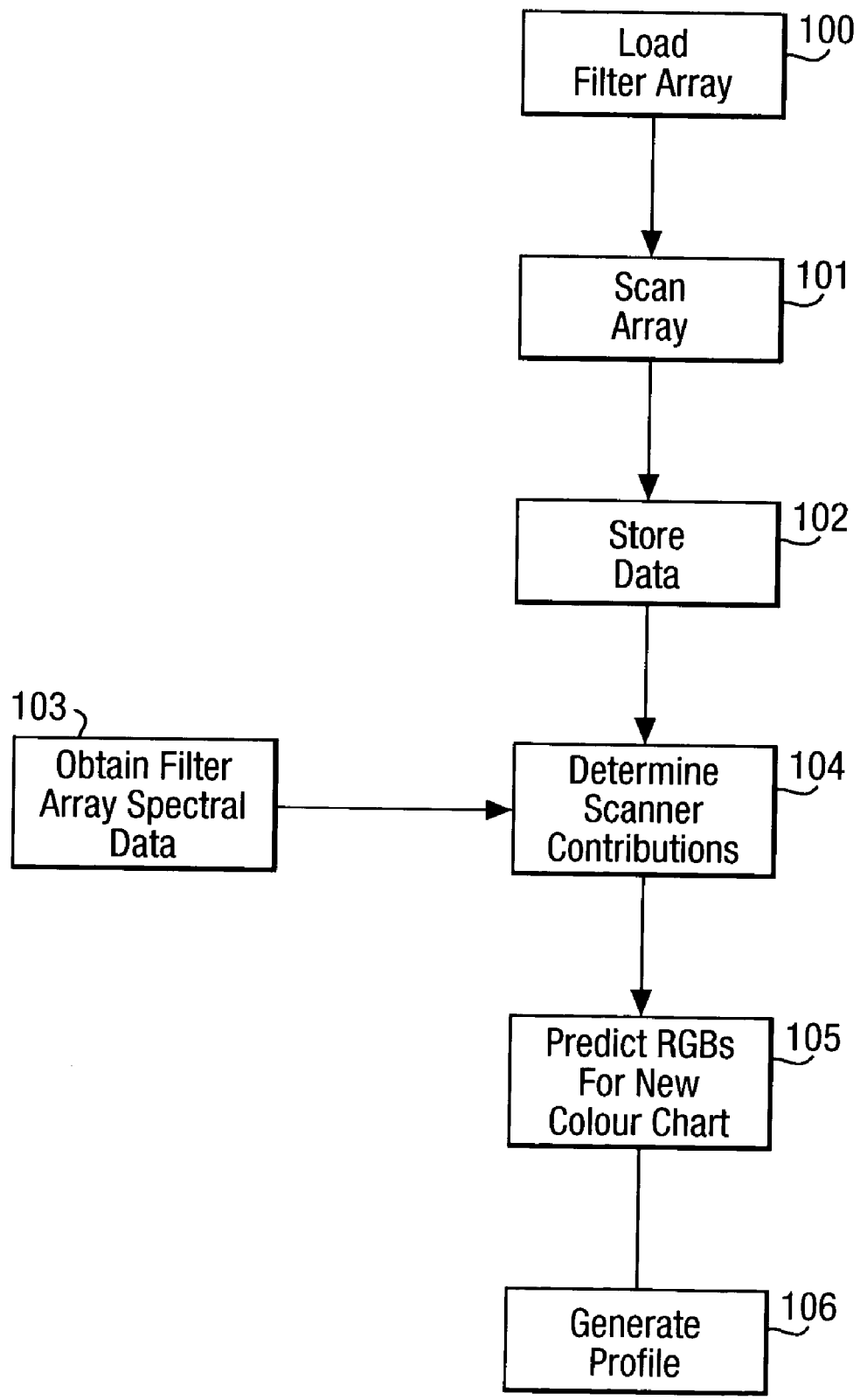

METHOD OF DETERMINING A DEVICE SPECTRAL RESPONSE

FIELD OF THE INVENTION

The present invention relates to a method of determining a device spectral response, for example in an imaging recording device such as a scanner or digital camera.

DESCRIPTION OF THE PRIOR ART

The use of scanners is well known to convert information upon a scanned medium into electronic form. Accordingly, scanners are wide spread in the photographic and image processing industries, in addition to being common in personal computing applications for domestic users. One important application of scanners is in the accurate reproduction of colour information contained upon a medium such as that of a colour image.

Unfortunately, the data representing uncorrected information from a scanned medium is generally not a colour accurate reproduction of the original. This is particularly problematical in colour scanners where the detection of colour information is usually achieved by the use of a light detector in combination with a number of colour filters. For colour scanners, the scanner integrates the intensity of the light received over an area of the visible spectrum of the scanner to produce a single value of the integrated intensity in that area. Typically three values are measured using three colour filters (red, green and blue).

Accordingly, for a particular point on the medium, the intensity of light received over the spectrum through each filter is recorded. This produces three values R,G,B corresponding to the red, green and blue filters and these "RGB" values represent the colour of the particular location of the medium as "seen" by the scanner.

Each of the three colour filters has a characteristic spectral response. The overall scanner response is also effected by the light source (which has an associated spectrum), the scanner optics and the light detector.

The standard approach to overcoming the lack of colour accuracy is by the use of colour charts, the idea being to produce a chart having "patches" of various colours and then to scan this chart and store the various R,G,B data values which are produced.

Each of the chart patches has a corresponding "true" colour which may be defined in accordance with industry standards by "X,Y,Z" or "L,A,B" values. These define a particular colour and therefore the desire is to relate these values to those produced by the scanner using the R,G,B filters. The conventional approach to achieve this, is to scan the patches upon a colour chart and then form a transformation of the data in order to describe the relationship between the X,Y,Z/LAB values and the R,G,B values. This transformation forms the basis of an input profile or characterisation for the scanner.

One problem with this is that the colour produced by the chart depends upon not only the medium on which the chart is prepared but also the dyes used in the creation of the various colours (as usually a small number of dyes are used in combination to produce a particular colour).

As a result, the correspondence between the X,Y,Z and R,G,B values does not readily generalise to any medium and indeed it also depends upon the actual constitution of the colour chart patches selected. Colour charts produced by different manufacturers therefore have different corresponding relationships relating the XYZ/LAB visual colours to the R,G,B values produced by the scanner. There is therefore a desire to overcome these problems and produce a method which is substantially independent of the colour chart used to generate the scanner profile and therefore will generalise more readily.

In particular, it is desirable that such a method is accurate and rapid as each scanner has apparatus variations and therefore the method should be applied to each scanner individually. Similar comments apply to other image recording devices.

SUMMARY OF THE INVENTION

In accordance with a first aspect of the present invention, we provide a method of determining a device spectral response for an image recording device, the method comprising:

obtaining a filtered light response from a number of filters of a filter set, wherein each filter has a pass band with at least one boundary defined by a transition region, wherein in the wavelength region of interest, adjacent transition regions of the same sense are substantially non-overlapping;

storing the obtained filtered light response for each filter as response data; and determining the device spectral response using the stored response data and separately determined data describing the spectral response of the number of filters.

According to the present invention, the identification of the device spectral response is provided by the use of the filter set which allows the response at different wavelengths to be analysed. In addition, the actual spectral responses of the filters are separately determined and this information is used in conjunction with the response (for example, obtained values) stored according to each filter, in order to determine the spectral response of the device. Examples of such image recording devices include scanners and digital cameras.

The use of such a response is particularly advantageous for scanners in that it reduces the time required to generate scanners characterisations (profiles) for various media by removing the need to scan the individual media on the target device.

The determined "device spectral response" in fact typically comprises a number of individual and independent responses. We have realised that the commutative nature of the contributions from the various apparatus within the scanner or camera allows these contributions to be treated as a unitary response.

The response of the detector is generally included in this unitary response along with responses from the device optics such as any lenses, mirrors and other filters thus obtaining an "overall" device spectral response encompassing the entire characteristic of the device. In particular for scanners, the device spectral response preferably includes a spectral response of the scanner light source.

In the case of colour devices, separate device spectral responses are typically determined for one or more of a red, green or blue scanner channel respectively. Typically three colour channels as used such as red, green and blue channels respectively (although other numbers of channels could be used).

A separate device spectral response is preferably determined for each channel used. Red, green and blue device spectral responses can be determined using the corresponding red, green and blue filters and the device spectral responses for each may include the spectral responses of these filters as part of the unitary response. The separate responses corresponding to these three colours could be obtained using three separate images or scans, although typically they are obtained in a single step by dividing the incident light from the filters and passing it through the individual colour filters, for example using a beam splitter.

In addition rather than performing a separate scan or obtaining a separate image for each of the number of filters in the filter set, these filters may be arranged such that the response is obtained for each filter in a single step. For example this may be achieved in a scanner by arranging the filters in an array upon the scanner platen.

The separately determined data describing the spectral response of the number of filters of the filter set may be represented discretely as a matrix, such that for each filter, the spectral response is described as a series of values across the spectrum and wherein the matrix is formed from the said discrete values for each filter of the number of filters.

The inverse of this matrix in conjunction with the scanned values for the filter set can then be used in determining the device spectral response. Typically this is achieved by multiplying the obtained responses (values) for the filters by the inverse matrix of the spectral response of the said filters.

The device spectral responses for each colour are generally represented as vectors having an identical number of components to the number of components used in the representation of the filter spectra.

A number of mathematical techniques are available for use in inverting the spectral response matrix and in particular singular value decomposition methods have been found to generate favourable results. These methods may be conveniently performed upon a computer system such as a desktop PC or a dedicated onboard computer within a scanner/camera.

Although one location for each filter from the filter set may be used to perform the method, a more accurate result may be achieved by using a number of locations for each filter.

The separately obtained spectral measurements can be made by placing the filters within apparatus such as a spectrophotometer. Again greater accuracy can also be achieved here by using a number of measurements at different locations across the filters.

Once the device spectral response has been determined it can then be used in a number of ways.

In particular, in accordance with a second aspect of the present invention a method of predicting recorded data for an image recording device is provided, the recorded data describing the appearance of a number of locations in a target image. The method comprises:
determining data describing a device spectral response using a method according to the first aspect of the invention;
obtaining spectral data describing the appearance of each of the locations in the image; and, processing the spectral data in accordance with the determined data to generate the predicted recorded data.

The spectral data for the target image may be obtained using apparatus such as a spectrophotometer as described above. For scanners, any scanned medium can be used as a source of the target image although typically the scanned medium is a colour chart, such as one of the number of colour charts used within the art. Each patch upon such a colour chart may be used to generate spectral data. Typically, the step of processing the spectral data comprises convoluting the spectral data with the determined data in the form of the overall device response. For colour scanners, the predicted data are generally presented in the form of R,G,B values.

The ability to accurately predict the R,G,B values removes the need for numerous scans of different media types to be performed. In addition, having effected the separation of the device spectral response, the ability to predict R,G,B values can be used with a known method of converting these values into LAB or XYZ values. As a result, an additional step of determining a relationship between the predicted device values and the LAB or XYZ values can be performed, so as to generate a device profile, or characterisation. This relates what the scanner sees in RGB values in device dependent space into a visual, device independent space i.e. LAB.

As the scanner (device) spectral response is independent of the medium scanned, profiles can be generated for known colour charts (previously used in the characterisation of scanners) without performing actual scans. The only data needed to generate such profiles is accurate spectral data from each area of the colour chart and the device spectral response. Using the combination of the device response and the spectra of the media, scanner values in RGB may be synthesised and patch LAB values may be determined directly from the patch spectra. Thus using standard techniques common in the art a transformation may be generated relating device dependent RGB values to device independent LAB values in a scanner profile or characterisation. The ability to form a transform between LAB/XYZ and RGB values for a scanner, without the need to individually scan the media therefore reduces the time and expense of generating profiles. Digital cameras can also be characterised in this way.

The accuracy with which the device spectral response may be determined is in part dependent upon the filter set used. Therefore in accordance with a third aspect of the present invention we provide a filter set for use in determining a device spectral response for an image recording device. Each filter has a pass band with at least one boundary defined by a transition region, wherein in the wavelength region of interest, adjacent transition regions of the same sense are substantially non-overlapping. The transition regions of the filters are arranged to be substantially non-overlapping (in wavelength) as overlaps significantly reduce the accuracy of the results achieved.

A number of different filter types can be used. For filter sets having filters in which a single transition region is present in the wavelength region of interest, the transition regions of the filters are preferably arranged adjacent one another within this region.

In this case, preferably each transition region is bounded by upper and lower wavelengths and the filter set is arranged such that the upper wavelength of one transition region and the lower wavelength of an adjacent transition region are at substantially the same wavelength.

Examples of such filters include high pass wavelength filters in which wavelengths of light longer than those within the transition region are substantially passed by the filter whereas wavelengths of light shorter than those within the transition region are substantially blocked. Alternatively, low wavelength pass filters can be used such that wavelengths of light smaller than those within the transition region are substantially passed by the filter whereas the wavelengths of light longer than those within the transition region are substantially blocked.

A further alternative is to use filters having more than one transition region, such as band pass filters. In this case each filter has a pass band within upper and lower wavelength boundaries, each boundary being defined by corresponding upper and lower transition regions of opposite senses, each transition region being within the wavelength region of interest. Each filter of this kind typically has an upper and lower transition such that only light of a wavelength between the upper and lower transitions is substantially passed by the filter whereas light of other wavelengths is blocked.

Preferably the filters are arranged such that their corresponding pass bands are substantially adjacent in the wavelength region of interest. For adjacent filters, the transition region of one filter is therefore preferably adjacent to the transition region of the opposite sense for an adjacent filter.

In general when filters of similar type are used within a filter set, the transition regions of the same sense for each of these filters are preferably substantially equally spaced in wavelength with respect to one another. In this way the part of the optical spectrum of interest can be spanned evenly.

For all transitions, it is desirable that the transition as a function of wavelength between the effect of allowing light to pass and to be blocked is as rapid as possible. This allows an increased number of filters to be used in that the transition between the filtering (block) and non-filtering (pass) effect is limited to a very narrow wave band.

Depending upon the arrangement of the particular scanner, the filters may be arranged as either transmissive or reflective filters.

In accordance with a fourth aspect of the present invention the method according to the first or second aspects of the invention is performed using a filter set in accordance with the third aspect of the present invention.

BRIEF DESCRIPTION OF THE DRAWINGS

An example of the method according to the present invention will now be described with reference to the accompanying drawings, in which:

FIG. 9 is a flow diagram of the method.

DETAILED DESCRIPTION

Figure 1:
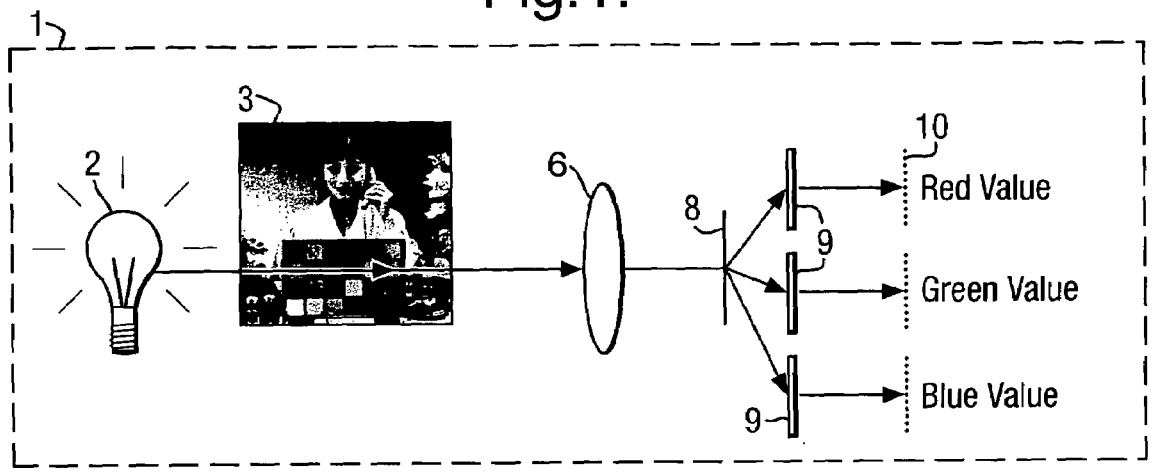
FIG. 1 is a schematic representation of a scanner.

FIG. 1 is a schematic illustration of the main components of a known scanner apparatus, generally indicated at 1. A light source 2 is provided which illuminates a medium 3, the medium 3 in this case being a photograph.

As is known, scanners can have either transmissive or reflective configurations, such that the light from the light source is either passed through or reflected from the medium 3 respectively.

In FIG. 1, a transmissive scanner is shown in which light transmitted through the medium 3 is analysed. The transmitted light passes through a lens or lenses 6 and impinges upon a beam splitter 8. The beam splitter 8 divides the incoming light beam into three beams which are then directed through three transmissive colour filters 9.

The three colour filters 9 are provided in the form of red, green and blue filters. These filters are arranged to only allow the passage of light having wavelengths within the corresponding spectral ranges of red, green and blue light. Each of the three filtered light beams then impinges upon detectors 10 where the intensity of the component beams is converted into corresponding data and these data are eventually output by the scanner as red, green and blue values respectively.

The spectra of the light beams from each of the filters 9, when measured at the detectors 10, contains spectral contributions from a number of the components within the scanner, and in particular the light source 2, the medium 3 (this being the spectrum of interest) and one of the colour filters 9.

Figure 2:
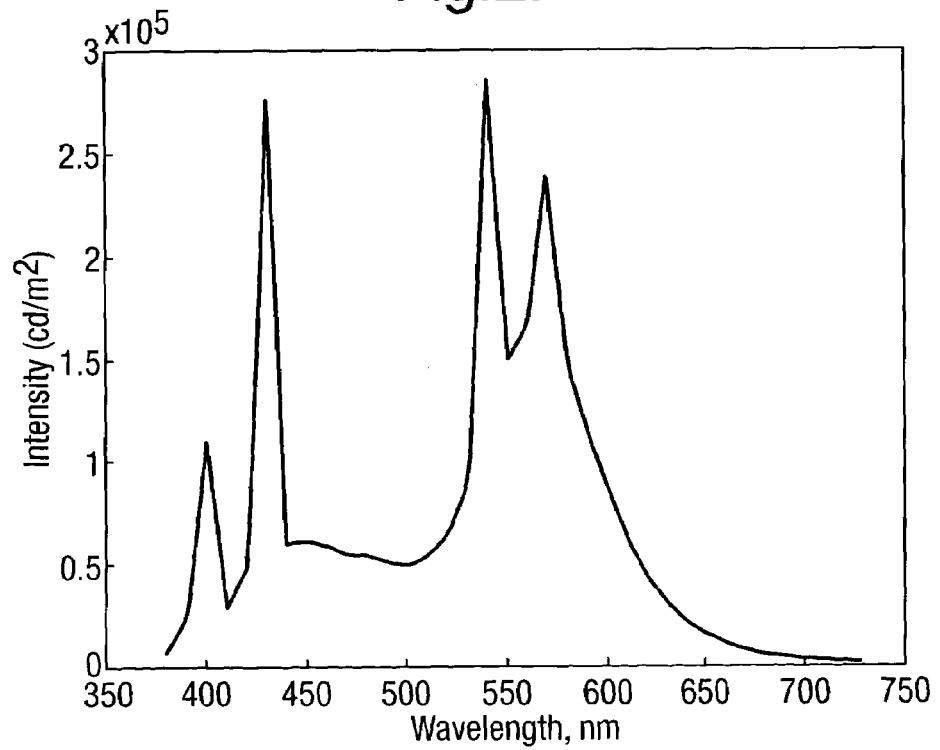
FIG. 2 shows a typical spectrum for a light source.

Referring now to FIG. 2, a typical spectrum from the light source 2 is shown. It can be seen immediately that this contains characteristic peaks and that therefore the intensity of the emitted light at some wavelengths is much greater than that at others.

Figure 3:
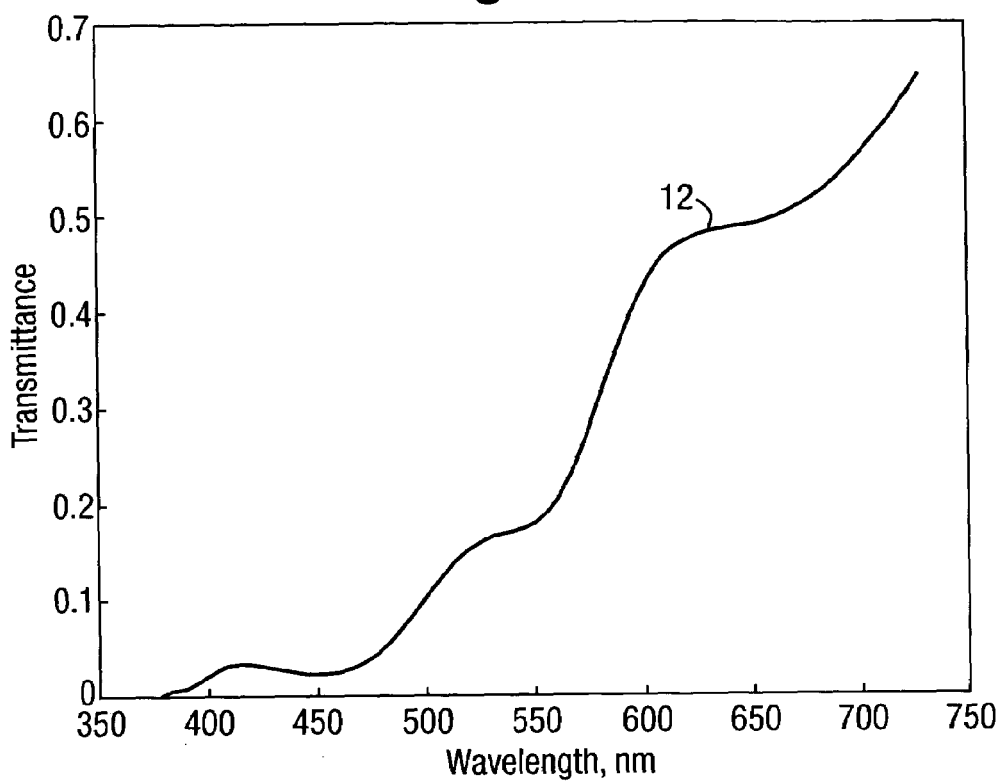
FIG. 3 shows a typical spectrum from a medium.

In FIG. 3, a spectrum 12 is indicated which represents the spectrum of a particular point upon the medium 3 assuming it were illuminated with incident light having a constant intensity at all wavelengths (pure white light).

The spectral response of typical red, green and blue filters 9 is indicated at 13, 14, 15 respectively in FIG. 4, again using pure incident white light. In addition, a further filter is often provided which blocks most of the incident infra-red wavelengths, that is those greater than 700 nanometres. This prevents unwanted heating of the apparatus and infra-red light outside the visible spectra affecting the red response.

Figure 4:
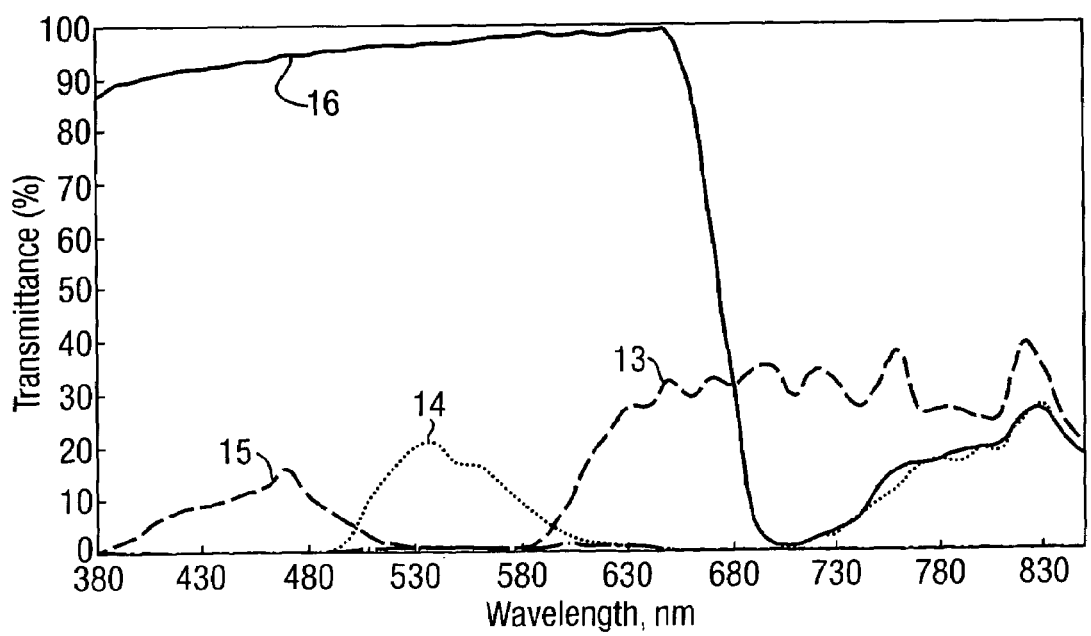
FIG. 4 illustrates typical R,G,B and infra-red filter spectral responses.

The spectral response of this filter is shown at 16 in FIG. 4. In some cases an additional ultra-violet filter is also provided (not shown).

As a result of the combination of the spectral responses of the light source 2, medium 3, and the filters 9, including any additional infra-red or ultra-violet blocking filters, three overall spectra corresponding to the three colour filters 9 are presented to the detector(s) 10 of the scanner 1.

Figure 5A:
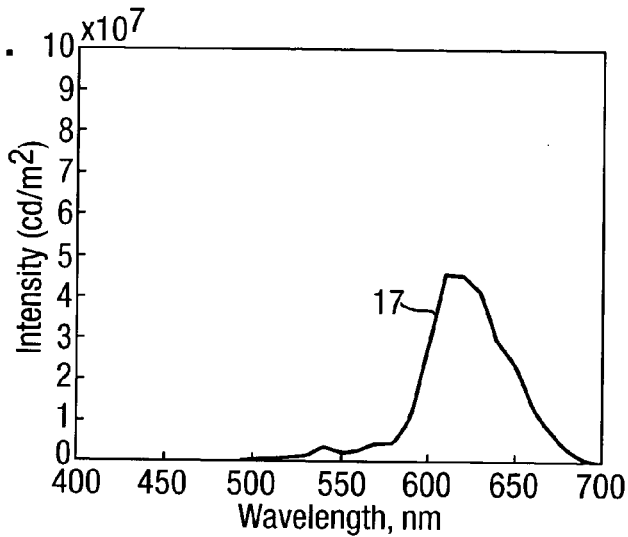
FIG. 5a shows the combined spectrum obtained through the red filter.
Figure 5B:
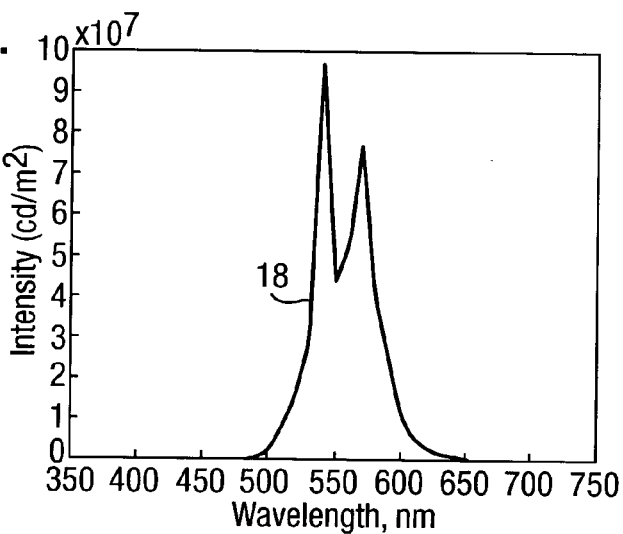
FIG. 5b shows the combined spectrum obtained through the green filter.
Figure 5C:
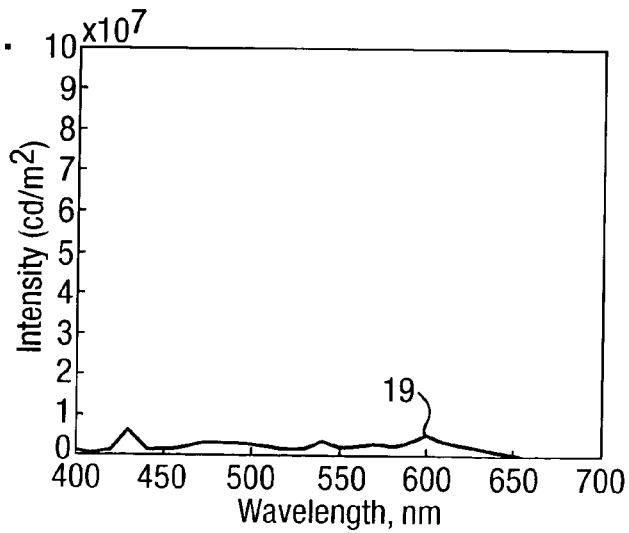
FIG. 5c shows the combined spectrum obtained through the blue filter.

Examples of these three spectra are shown in FIGS. 5a, 5b or 5c for the red, green and blue filters respectively. It can be seen in FIG. 5c that very little light is incident upon the detector 10 for the blue filter 9 as would be expected when the spectrum of FIG. 3 is considered as this has little intensity at shorter wavelengths.

The detector 10 operates by effectively integrating the total light intensity received for all light wavelengths across the visible spectrum, in this case being from 400 to 700 nm. A separate integration is performed using each of the three spectra according to the red, green and blue filters 9. Examples of the resultant spectra 17, 18, 19 for the three filters are shown in FIGS. 5a, 5b and 5c for the red, green and blue filters respectively.

The integration over the spectrum is therefore the area under the respective spectral curves and each of these is given a single value corresponding to the respective filter, so as to provide the "RGB" values in accordance with the art.

It should be remembered that each of the combined spectra shown in FIGS. 5a, 5b and 5c includes not only the responses from the light source and filters, but also that of the medium 3.

Figure 6:
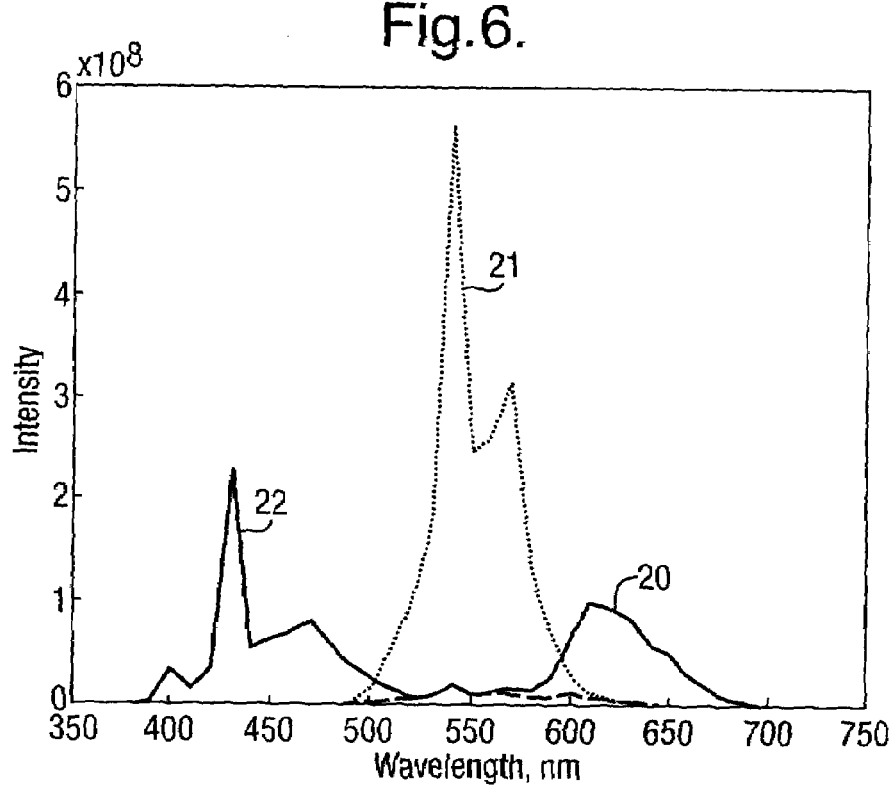
FIG. 6 illustrates the combined responses from the scanner.

The scanner spectral response is illustrated in FIG. 6 where the individual contributions according to the light source 2, lenses 6, red, green and blue filters 9 and detectors 10 are shown as spectra 20, 21 and 22 respectively. The spectra when multiplied by the spectrum 12 from the medium 3, produce the three corresponding overall responses shown in FIGS. 5a, 5b and 5c.

Figure 7:
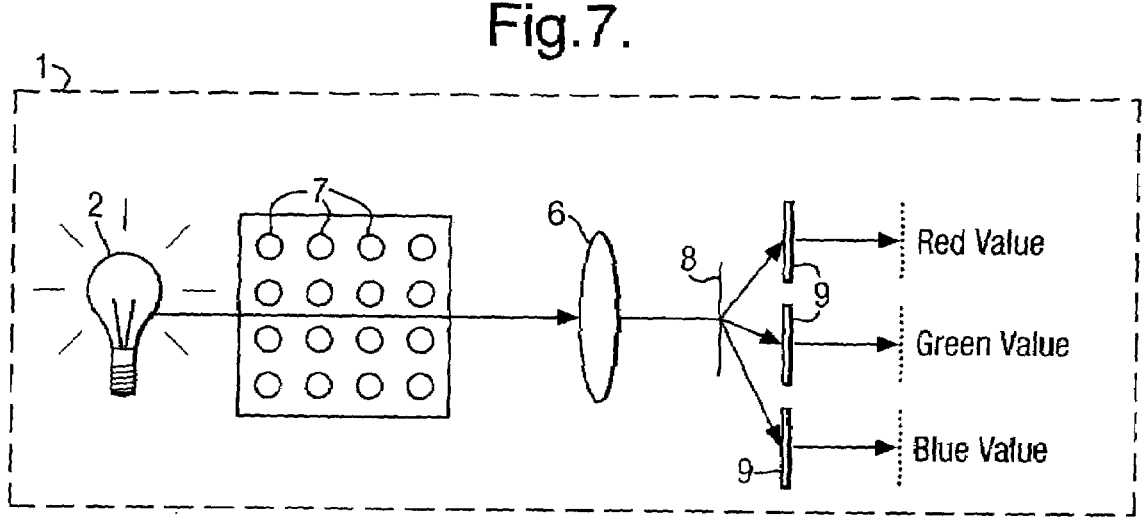
FIG. 7 shows a schematic representation of a scanner arranged to scan an array of filters in a filter set.

With respect to the known scanner described above, the example of the present invention replaces the medium 3 with a number of filters as shown in FIG. 7. Each filter 7 belongs to a filter set and these are arranged in an array such that light from the light source 2 is passed through each of the filters 7 individually during a single scan. The scanned values obtained are then processed along with the filter spectra to determine scanner response.

Figure 8:
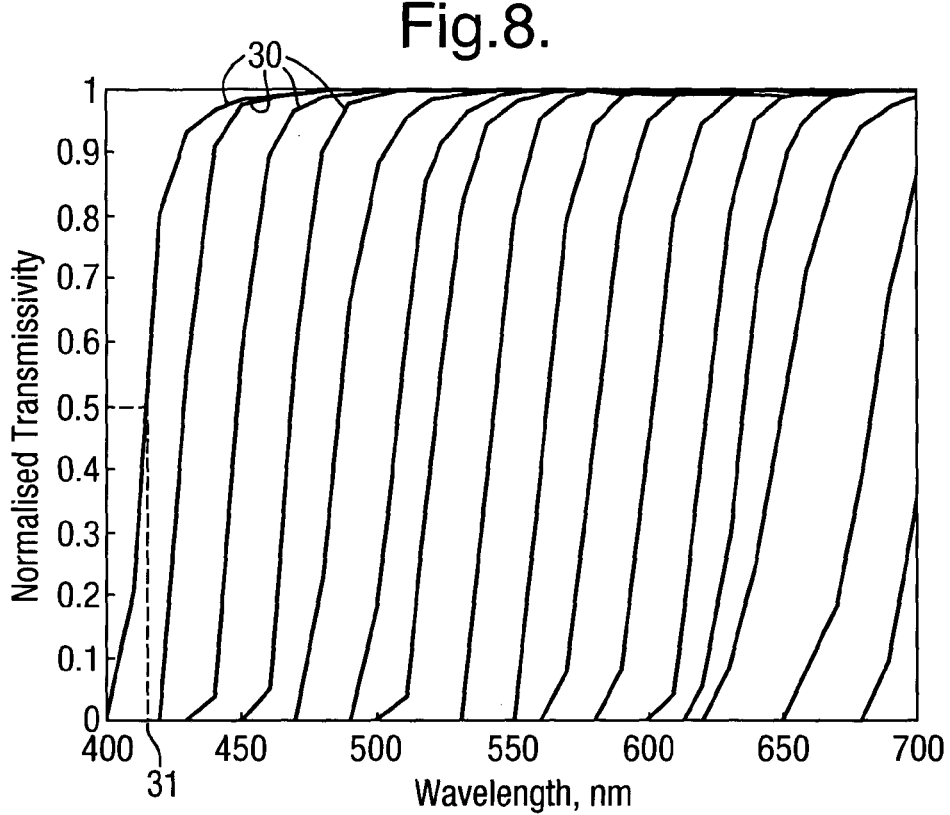
FIG. 8 shows the spectral responses of a filter set.

The spectral responses 30 of a suitable filter set having a number of filters 7, are shown in FIG. 8. In this case, each filter is a high pass (blocking) filter.

As can be seen, each filter exhibits a rapid transition between a very low transmissivity (blocking light) and a high transmissivity (passing light). This transition occurs over a few nanometres in wavelength. A threshold 31 in wavelength can be defined for each filter which in this case represents a transmissivity of substantially one half of the maximum value obtained by the filter.

As shown in FIG. 8, the filters 7 within the filter set are chosen such that their threshold values are spaced across the range of interest of the optical spectrum, this being between 400 and 700 nanometres in this case.

Using this filter set, a suitable method of de-convoluting the scanner spectral response is shown in FIG. 9.

At step 100, the filter set array is loaded into the scanner.

A scan is then performed of the array of N filters at step 101. In doing so, light from the light source 2 passes through the filters 7, impinges upon the beam splitter 8 and passes through the colour filters 9 to the detectors 10. Corresponding individual R,G and B values representing the integration of the component spectra shown in FIGS. 5a, 5b, 5c, are then recorded for each of the N filters 7 of the array.

The finite dimensions of each filter 7 are used to advantage in that R,G,B values are determined for a number of locations within each filter. These are "seen" by the detector as pixels and therefore the R,G,B values for a particular filter 7 are averaged (using the data from a number of these pixels) in order to produce a more representative value in each case. The scanned values are then stored at step 102.

For a particular point (seen as a pixel) on the filter 7, the R,G,B values can be represented mathematically as:

$$R = \int_{400nm}^{700nm} \Phi(\lambda) R_S(\lambda) \quad G = \int_{400nm}^{700nm} \Phi(\lambda) G_S(\lambda) \quad B = \int_{400nm}^{700nm} \Phi(\lambda) B_S(\lambda) \quad (1)$$

Where:
$\Phi$ is the spectral transmittance (or reflectance) of the point of the filter 7 in question as a function of the light wavelength $\lambda$, and $R_S, G_S, B_S$ are the red, green and blue scanner spectral responses respectively, again as a function of wavelength, using the corresponding red, green and blue filters 9. As indicated by the integral limits in Equation 1, each of the R,G,B values is determined by integrating over the "visible" wavelength, which for this example is between 400 and 700 nm.

For calculations using real data, the above integrals are converted into discrete mathematics. The spectral response $\Phi$ of each filter 7 can be represented as a vector of order M, where M is the number of samples taken across the spectrum (from 400 to 700 nm here). The samples are taken at constant intervals across the spectrum and represent the intensity of the response at a particular wavelength (or over a range of wavelengths). The wavelength range may be equal to the difference in wavelength between the sampling points.

One method of obtaining the values for the matrix $\Phi$ is to measure the optical properties of the filters 7 directly using apparatus such as a spectrophotometer. In this example, for each of the N filters, M values are used spanning the spectrum, the values taking the form of average intensity values for the spectrum in wavelength ranges, such as 10 nm (400–409 nm for example). This produces 31 discrete values for the optical wavelengths of interest. These data are obtained at step 103.

As there are N filters 7, and M measurements for each filter, then this information may be represented as an "N by M" matrix $\Phi$, as set out below:

$$\Phi = \begin{pmatrix} \phi_{1,1} & \cdots & \cdots & \phi_{1,M} \\ \cdots & \cdots & \cdots & \cdots \\ \cdots & \cdots & \phi_{i,\lambda} & \cdots \\ \phi_{N,1} & \cdots & \cdots & \phi_{N,M} \end{pmatrix} \quad [2]$$

The matrix $\Phi$ therefore contains all of the data describing the spectral responses of the N-filter array. The three spectral responses of the scanner (which are media independent) (that is for the red, green and blue filters 9), can be represented as three corresponding vectors of dimension "M":

$$R_S = (R_1, R_2, \ldots, R_\lambda, \ldots, R_M) \quad [3]$$

$$G_S = (G_1, G_2, \ldots, G_\lambda, \ldots, G_M) \quad [4]$$

$$B_S = (B_1, B_2, \ldots, B_\lambda, \ldots, B_M) \quad [5]$$

These vectors represent the scanner spectral responses in terms of discrete values across the spectrum as a function of wavelength.

A set of R, G and B values, as determined by the scanner, are produced for each filter 7. Therefore the number of R, G and B values is N. The values for the R filter 9 can be represented as an N component vector, and similarly for the G and B values. Specifically, these can be represented as:

$$R_V = (R_{V,1}, R_{V,2}, \ldots, R_{V,N}) \quad [6]$$

$$G_V = (G_{V,1}, G_{V,2}, \ldots, G_{V,N}) \quad [7]$$

$$B_V = (B_{V,1}, B_{V,2}, \ldots, B_{V,N}) \quad [8]$$

where each component $R_{V,1}$ etc, actually represents an average value of a number of pixels within the scanned area for a particular filter 7.

Equation 1 can therefore be rewritten in terms of the discrete Equations 2 to 8 as:

$$R_V = \Phi R_S^T \quad [9]$$

$$G_V = \Phi G_S^T \quad [10]$$

$$B_V = \Phi B_S^T \quad [11]$$

where the "T" superscripts represent the transpose conjugate of the vectors $R_S, G_S, B_S$.

Each of the component values of $R_V$, $G_V$, $B_V$ are obtained by scanning the filters 7 with the scanner. The values of the matrix $\Phi$ components are also required in order to determine the scanner spectral responses $R_s$, $G_s$, $B_s$. Rearranging Equations 9 to 11, the scanner spectral responses are given as:

$$R_S^T = \Phi^{-1} R_V \quad [12]$$

$$G_S^T = \Phi^{-1} G_V \quad [13]$$

$$B_S^T = \Phi^{-1} B_V \quad [14]$$

where $\Phi^{-1}$ is the inverse matrix of $\Phi$. These equations are then solved at step 104.

As will be appreciated, in general it will not be possible to generate an analytical solution to $\Phi^{-1}$ since the matrix $\Phi$ may not be square and is filled using experimental data.

However, one of a number of known approximate mathematical methods may be used to solve the inverse matrix. Suitable methods include that of performing a "pseudo" inverse for example as described in "Numerical Recipes in C, The Art Of Scientific Computing", by William H. Press, Saul A. Teukolsky, William T Vetterling and Brian P Flannery, Published by Cambridge University Press, ISBN 0-521-43108-5 which estimates the inverse using a Gaussian elimination method. Another method is to use "least squares" although this encounters problems with negative values. Negative values are not practically possible in a filter, so the solution may be mathematically correct but not represent a real filter.

A particularly successful method is that of singular value decomposition (SVD). Using this technique, the matrix $\Phi$ can be divided into three matrices as:

$$\Phi = [U].[W].[V] \quad [15]$$

where W is a diagonal matrix of the same dimension as the matrix $\Phi$, with non-negative diagonal elements in decreasing order. U and V are unitary matrices. This gives:

$$\Phi^{-1} = [V].[1/W].[U]^T \quad [16]$$

If Equations 12 to 14 are rewritten in terms of Equation 16, then an solution can be found for the scanner responses $$R_S^T, G_S^T, B_S^T.$$

The actual method used in the present example is an extension to the SVD process called "SVD Fit" as described in "Numerical Recipes in C", referenced above. This method is similar to that of SVD except that it has the ability to weight the solution. This weighting is useful in the present example as the spectra from the red, green and blue filters 9 can therefore be limited to appropriate parts of the spectrum. The SVD fit method directly produces a solution for $$R_S^T, G_S^T, B_S^T.$$

As will be appreciated, it is beneficial to place a tolerance upon the Eigen values in W. Small Eigen value contributions will dramatically affect the solution of Equation 16 (due to the "1/W" term). In addition, it is possible to reduce the resultant high frequency noise (caused by higher Eigen vectors and values) by ignoring some of these higher values.

An analysis of the contribution of the Eigen vectors to the final answer is therefore recommended. A combination of removing the small values in W, selecting only a number of the vectors and assessing the contributions from these vectors, leads to a stable solution bearing in mind that an oversimplification rejecting too many Eigen vectors will cause inaccuracies in the results. Therefore a balance should be maintained between removing noise on the one hand and maintaining accuracy on the other.

It will be appreciated that, the method will be generally implemented using a computer system. In this case a desktop PC can be programmed to perform the calculations associated with the method.

A number of known data processing techniques used in scanners can influence the accuracy of the results. For example, "gamma correction" is usually applied to scanned images in the form of a transfer function, as it is known that such gamma correction produces a more pleasing image to the eye when viewed on a screen.

The response data is also conventionally "logged" in order to compress the data range and this can affect the accuracy of the results due to the accuracy with which the logged data is recorded. Additional further processing is also sometimes performed upon the data.

In general, for the present method, it is desirable to use the data in the unprocessed or raw form, that is "linear" data in "transmission space", however, logging and gamma correction can generally be inverted to obtain transmission data.

Noise in the data should also be minimised in order to improve the accuracy of the results. Typically noise is a direct result of the accuracy to which the data are measured, the truncation of data and random noise within the system (such as due to the electronic components). It has been found that some filter sets are more suitable than others when attempting to reduce noise within the system. This is mainly due to the sharpness of the filter and the spacing of the filter set, also the quality of the filter and hence its uniformity can help to reduce noise.

In order to test the method, several different filter sets were examined for their ability to recover scanner response. Each filter set was used to create a filter array which was then scanned to recover the scanner spectral response.

Figure 10:
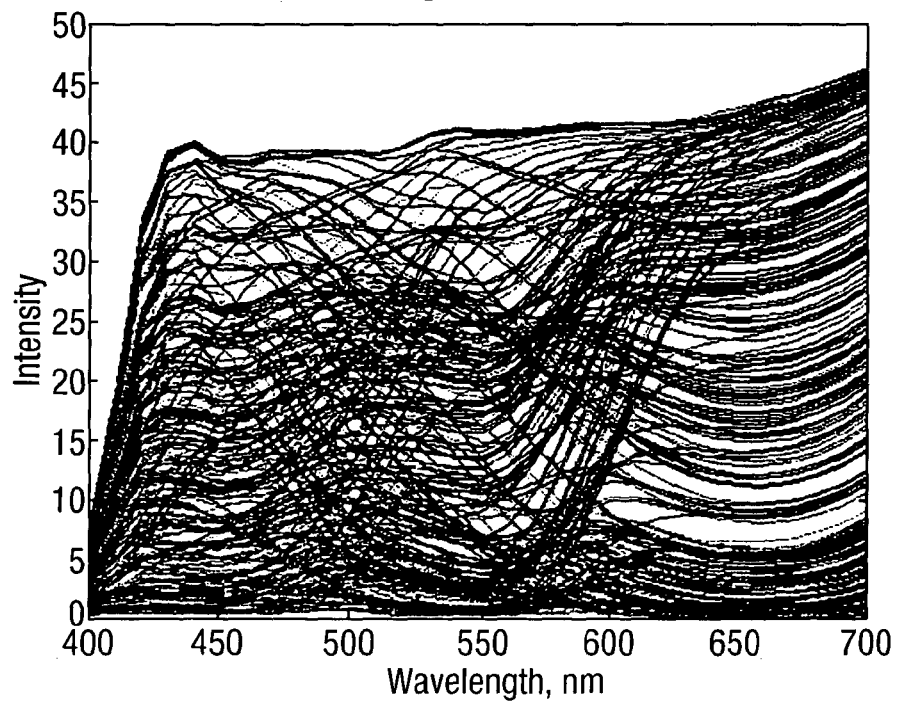
FIG. 10 represents the spectra from the IT8.7 data set.

Once the scanner spectral response was determined, this was then used to predict the response of the scanner to the IT8.7 data set using the spectra of the patches shown in FIG. 10.

Figure 11:
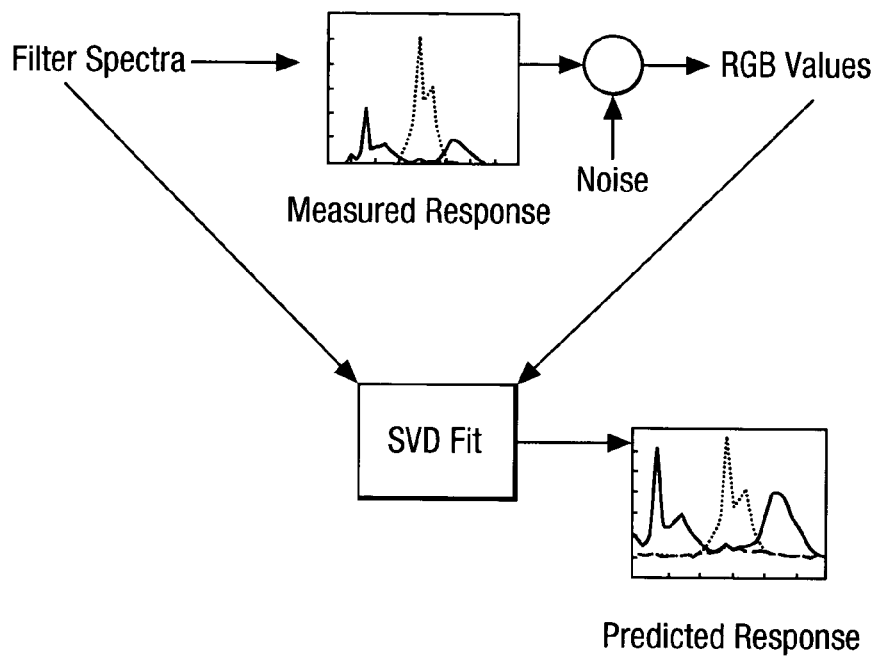
FIG. 11 shows the generation of RGB values; and,
FIG. 12 shows the method of comparison between predicted and measured values.

As shown in FIG. 11, the predicted RGB values for the IT8.7 data set were obtained by convolving the spectra from each patch with the scanner spectral response determined using the different filter sets.

Using spectra rather then real charts/paint sets is not a completely realistic analogue as, aside from the scan variations mentioned above, noise is always present within the scanner systems and this influences the results. In order to take account of this, an amount of mathematical random noise was added to the data to make the results more realistic. A set of "measured" RGB values were then calculated for the "measured" scanner response spectra.

Figure 12:
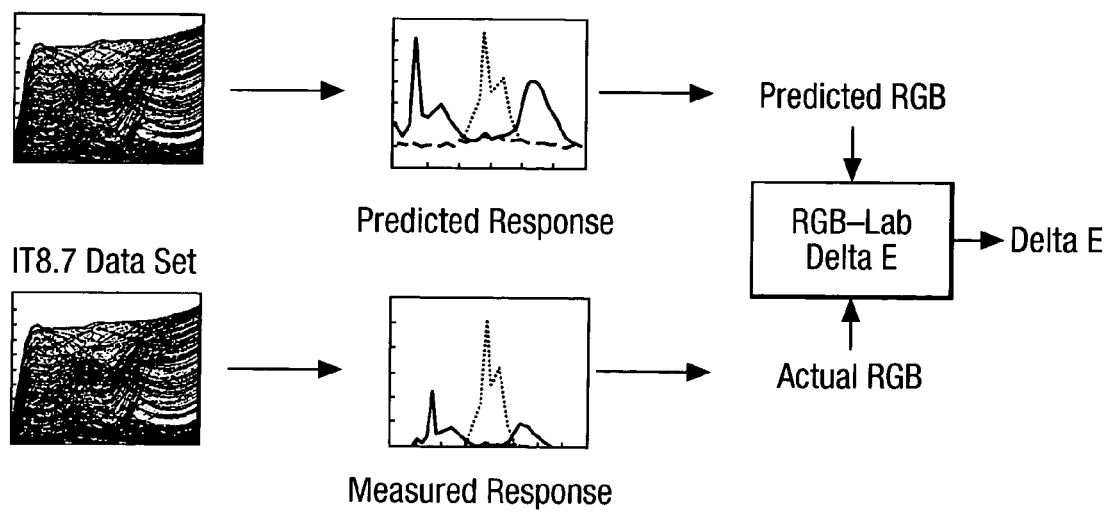

The predicted RGB values were then compared with the measured RGB values for IT8.7/3 charts and paint sets. In each case the RGB value was converted to an approximate LAB value to enable a "Delta E" number to be calculated. This gives a measure of the quality of recovery upon real data. The overall process is summarised diagrammatically in FIG. 12.

The predicted RGB values were then compared with the measured RGB values for IT8.7/3 charts and paint sets. In each case the RGB value was converted to an approximate LAB value to enable a "Delta E" number to be calculated. This gives a measure of the quality of recovery upon real data. The overall process is summarised diagrammatically in FIG. 12.

A major advantage of the invention is that, because the scanner spectral responses are independent of the medium scanned, once the responses have been evaluated for a scanner, further scans of new media are not required. The "characterisation" of the scanner can therefore be effected using a single scan of the filter set. It is not necessary to perform any further scans as these can be represented with data describing their spectra. The spectral data can be supplied to the customer along with the scanner, where the customer may scan the filter set and determine the scanner response, and hence may generate characterisations for the various media.

This also conveniently overcomes the problems associated with changes in the optical properties of colour charts due to ageing. In addition, for new media, the scanner response can be convoluted with the spectra of the new media, to produce RGB values. A set of "predicted" RGB values can therefore be generated for the new media and hence new characterisations. This additional step is shown at step 105 in FIG. 9.

As is known, a spectrum can be used to generate X,Y,Z or L,A,B values for the particular colour in question. Therefore, using spectral data for media, it is possible to generate L,A,B (if these are unknown) and corresponding R,G,B values without performing the scans which would ordinarily be required.

This leads directly to the ability to generate an input profile for the scanner which establishes a relationship between the L,A,B and R,G,B values without performing scans upon the new media. Conventional methods for determining the relationship between these values can be used. This is shown at step 106 in FIG. 9.

It is however important that the method is as accurate as possible because the input profile is generated based upon the predicted rather than the scanned R,G,B values.

As a result of experimentation it has been found that the filters should have very narrow transitions in wavelength and that there should be minimal overlap between transitional regions of the filters. The visible spectral range should ordinarily be covered by these filters.

It can be seen that the present method may be employed to obtain the scanner spectral responses with sufficient accuracy to enable RGB values predictions to be made and a corresponding scanner profile generated.

Although an example of the invention has been described above in connection with a scanner, it will be appreciated that analogous filters and methods can be used in order to determine device spectral responses for other image recording devices. In particular these include cameras which generate electronic images such as digital cameras.

I claim:

1. A method of determining a device spectral response for an image recording device, the method comprising:
   obtaining a filtered light response from a number of filters of a filter set, wherein each filter has a pass band with at least one boundary defined by a transition region, wherein in the wavelength region of interest, adjacent transition regions of the same sense are substantially non-overlapping in wavelength with respect to each of the other filters;
   storing the obtained filtered light response for each filter as response data; and
   determining the device spectral response using the stored response data and separately determined data describing the spectral response of the number of filters;
   wherein the step of determining the device spectral response comprises describing the spectral response of the number of filters of the filter set as an N by M matrix with N being the number of filters, such that for each filter, the spectral response is described as a series of M sampled values across the spectrum and wherein the matrix is formed from the said values for each filter of the number of filters, and multiplying the values representing the obtained filtered light response by the inverse matrix of the spectral response of the said filters, said inverse matrix being determined using singular value decomposition.

2. A method according to claim 1, wherein the image recording device has a light detector and wherein the determined device spectral response includes a spectral contribution from the light detector.

3. A method according to claim 1, wherein the obtained response contains color information.

4. A method according to claim 3, wherein separate device spectral responses are determined for one or more of a red, green or blue channel respectively.

5. A method according to claim 4, wherein the red or green or blue device spectral responses are produced using corresponding red, green or blue filters and wherein the scanner spectral responses include the spectral contributions from the said red, green or blue filters.

6. A method according to claim 1, wherein the step of obtaining a filtered light response from a number of filters is performed with a scanner and wherein the device spectral response is the scanner spectral response.

7. A method according to claim 1, wherein the device spectral response is reconstructed using a selected number of Eigen vectors from the inverse matrix.

8. A method according to claim 7, wherein the selection of the Eigen vectors is based upon their contribution to the device spectral response.

9. A method according to claim 7, wherein the selection is based upon the order of the Eigen vectors.

10. A method according to claim 7, wherein the selection is based upon the magnitude of the Eigen vectors.

11. A method according to claim 1, wherein the device spectral response is determined using an iterative method.

12. A method according to claim 1, wherein the obtained response, is determined by the total amount of light received over at least part of the spectrum.

13. A method of predicting recorded data for an image recording device, the recorded data describing the appearance of a number of locations in a target image, the method comprising:
   determining data describing a device spectral response using a method according to claim 1;
   obtaining spectral data describing the appearance of each of the locations in the image; and,
   processing the spectral data in accordance with the determined data to generate the predicted recorded data.

14. A method according to claim 13, wherein the step of obtaining the spectral data comprises determining the spectral data using a spectrophotometer.

15. A method according to claim 13, wherein the step of processing the spectral data comprises convoluting the spectral data with the determined data.

16. A method according to claim 13, and when dependent upon claim 3, wherein the predicted scanned data is in the form of R, G, B values.

17. A method according to claim 13, further comprising the step of determining a relationship between the predicted recorded data and the spectral data obtained so as to generate a recording device profile.

18. A method according to claim 13, wherein the spectral data are represented in the form of LAB or XYZ values.

19. A method according to claim 13 wherein the image recording device is a scanner and wherein the target image is obtained by scanning a target medium.

20. A method according to claim 19, wherein the scanner has a light source and wherein the determined device spectral response includes a spectral contribution from the scanner light source.

21. A method according to claim 19, wherein each of the number of filters of the filter set is scanned during a single scan.

22. A method according to claim 1, wherein the image recording device is a digital camera.

23. A method according to claim 21 for determining a scanner spectral response, wherein the said filters used in the step of scanning a number of filters comprise a filter set of filters each having a pass band with at least one boundary defined by a transition region, wherein in the wavelength region of interest, adjacent transition regions of the same sense are substantially non-overlapping.

24. A method according to claim 1, wherein each filter is a transmissive filter.

25. A method according to claim 1, wherein each filter is a reflective filter.

* * * * *